March 18, 1969     H. R. DUROCHER ET AL     3,433,442
PARACHUTE DEREEFING SYSTEM
Filed Nov. 25, 1966
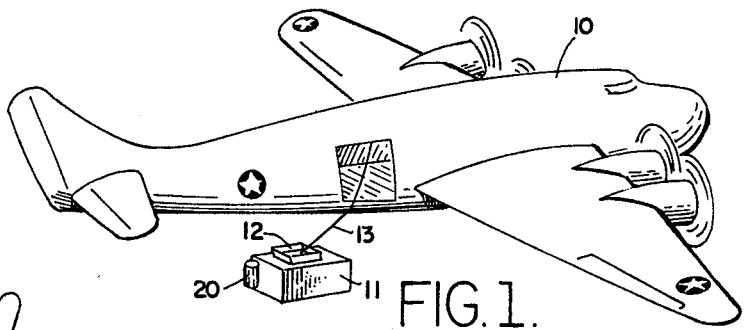
FIG. 1.
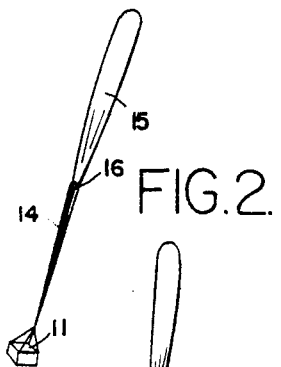
FIG. 2.
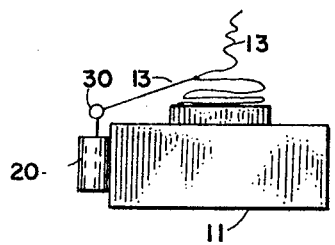
FIG. 6.
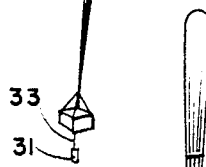
FIG. 3.
FIG. 4.
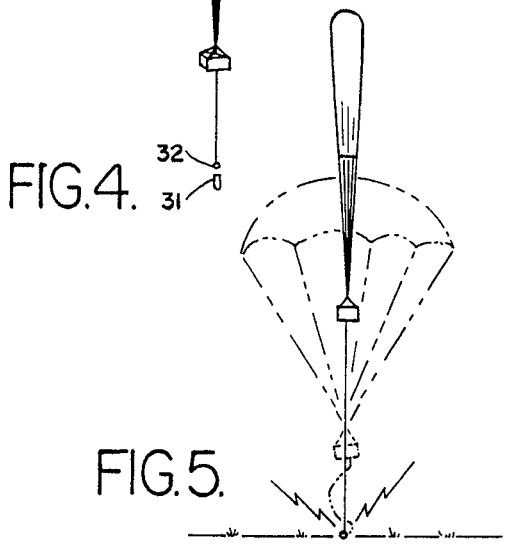
FIG. 5.
*INVENTORS*
HECTOR R. DUROCHER
JAMES A. WENTWORTH
RALPH H. BAER
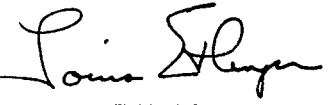
ATTORNEY

INVENTORS
HECTOR R. DUROCHER
JAMES A. WENTWORTH
RALPH H. BAER

BY *Louis [signature]*

ATTORNEY

INVENTORS
HECTOR R. DUROCHER
JAMES A. WENTWORTH
RALPH H. BAER

BY *Louis Erlen*

ATTORNEY

# United States Patent Office 3,433,442
Patented Mar. 18, 1969

3,433,442
PARACHUTE DEREEFING SYSTEM
Hector R. Durocher and James A. Wentworth, Nashua, and Ralph H. Baer, Manchester, N.H., assignors to Sanders Associates, Inc., Nashua, N.H., a corporation of Delaware
Filed Nov. 25, 1966, Ser. No. 597,016
U.S. Cl. 244—152     3 Claims
Int. Cl. B64d 17/00, 17/52

ABSTRACT OF THE DISCLOSURE

Apparatus is herein described for accurate, reliable and undamaged delivery of cargo by parachute from an aircraft. The cargo is fastened to a "reefed" parachute; dropped; and permitted to substantially "free-fall" for the major portion of the descent. At a set time during this descent, a switch is lowered a predetermined distance below the cargo. Once the switch impacts with the ground, it actuates an electric circuit, dereefing the parachute, thus permitting it to brake the cargo descent.

---

This invention relates generally to an apparatus for accurate air delivery of cargo by parachute and, more particularly, to an improved mechanism for dereefing an unopened parachute at an accurately predetermined height above the cargo impact point.

The development of military air power in recent years has significantly influenced the ground warfare concept of highly mobile teams of soldiers who, though very much self-sufficient, may require special equipment and supplies. Because these mobile contingents move about so rapidly, and are usually deployed in hostile territory, the success of air delivery of cargo in the final analysis depends on the accuracy of such delivery.

In conventional parachute techniques, cargo or personnel leaving an aircraft have a short static line connected from the parachute to the airplane and this static line pulls the parachute from its container, permitting it to billow out into operative condition. From this point until ground contact is made, the parachute and its cargo are considerably influenced by the winds aloft and as a practical matter, the cargo is frequently blown so far from its intended point of impact that the personnel for whom it was intended cannot reach it. That cargo is then wasted, and the effort that went into manufacture and attempting delivery are also wasted.

One solution to this problem has been to permit the cargo to "free-fall" toward its point of impact trailing a "reefed" parachute and have this parachute "dereef" or open just high enough above the ground to decelerate its fall. The term "reefed" as used in this disclosure describes a deployed parachute whose canopy is restrained from opening to its full extent. This general technique is in some respect considered quite satisfactory, since the descent of the cargo in a free-fall state can be predicted with some degree of accuracy, for example, much like a falling bomb. At some predetermined minimum altitude above the impact point, the parachute is made to open so as to lower the fall velocity of the cargo thereby preserving its integrity on impact. The deficiency of the prior art in employing this technique, however, has been the inability to consistently activate the parachute dereefing system at precisely the minimum altitude above the impact point.

Various prior art techniques have been developed in an attempt to initiate dereefing at the right time during descent. For example, barometric devices which can determine altitude by detecting changes in atmospheric pressure have been employed to activate a dereefing mechanism. Because a barometer only determines changes in atmospheric pressure, which can be related to altitude, the use of such a device depends on knowing in the first instance what the correct atmospheric pressure is at the geographical point of its use. In cargo air-dropping operations of the kind described, this preliminary data is virtually impossible to determine with any degree of accuracy; further meteorological conditions can vary with such rapidity and frequency that a dereefing mechanism whose operation is geared to such a device has shown to be rather unreliable.

Other attempts have been made to perfect timing devices of a mechanical and fuze-type nature. These have not performed satisfactorily because they function within a fixed interval of time once set into motion, and are accordingly unable to compensate for varying conditions of rate of descent of cargo due to differences in cargo drag or climatic conditions and will function without regard to how high or low the cargo may actually be above ground level.

We have discovered an air cargo drop concept in which cargo dropped from an aircraft is fastened to a trailing "reefed" parachute. This parachute remains in its reefed condition for a substantial portion of the cargo descent, serving as a stabilizer and drag member for the cargo which may initially be tumbling or gyrating violently. At a predetermined time during this descent, a switch is lowered a predetermined distance, (approximately 275 feet or more) beneath the cargo by a pair of electrical conductor wires from a switch assembly canister firmly attached to the cargo itself. As the cargo continues its descent, this switch suspended beneath the cargo eventually impacts with the ground, closing an electrical circuit sending an impulse along the pair of conductor wires to the switch assembly, thence through electrical conductors to a squib which explodes and thereby ruptures the reefing line, permitting the parachute to open to its full extent, braking the cargo descent just prior to ground impact, thereby preserving its structural integrity.

It is therefore among the various objects of this invention to provide a means for accurately air-dropping cargo from a relatively high altitude into a small target area.

It is a further object of this invention to provide a reliable mechanism for initiating parachute dereefing at an accurately predetermined height above ground level.

A still further object of this invention is to provide a parachute dereefing mechanism whose functioning is unrelated to atmospheric pressure changes or fuze-type timing mechanisms.

A feature of this invention is that the mechanism for full deployment of the parachute canopy from its reefed (i.e. partially deployed) condition is activated when the cargo in its free-fall descent has reached an accurately determined distance above its point of impact.

Another feature of this invention is that it requires no pre-setting of mechanism or determination of any condition prior to use; accordingly, it has universal application under virtually any circumstances or climatic conditions in earthly or other planetary environments, so long as gravitational influences are present.

These and other objects and features will become more apparent in light of the following disclosure when taken in light of the various drawings, in which:

FIGS. 1–5 illustrate in general schematic form the events occurring in a "plane to ground" sequence following cargo ejection;

FIG. 6 illustrates in enlarged detail the cargo, immediately following ejection with its parachute pack, static line, and switch deployment canister;

Figure 7:
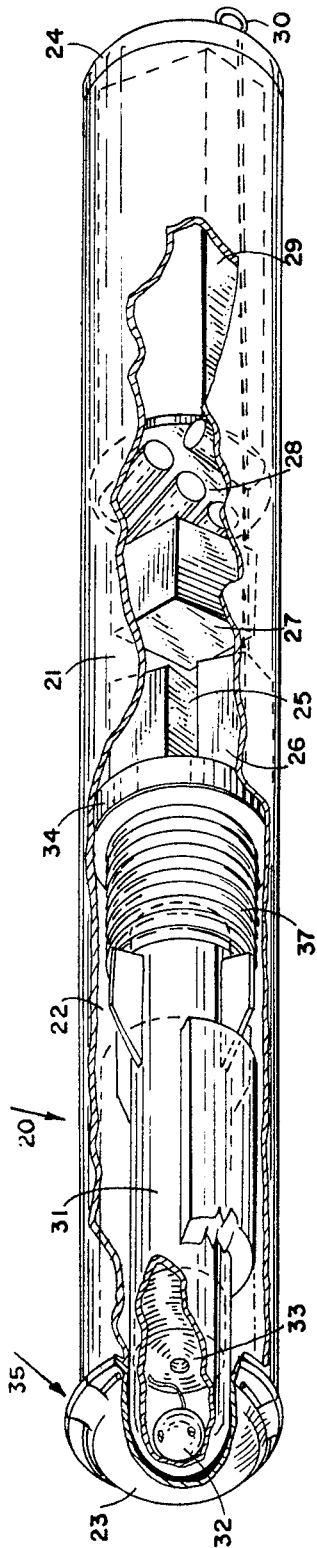
FIG. 7 depicts in schematic form the structural assembly of the deployment switch.

Referring now to the drawings, there is shown as FIGS. 1–5 in general schematic sequence, one embodiment in which this invention may be utilized. FIG. 1 shows a flying aircraft 10 ejecting its cargo 11. Securely fastened to the cargo is a folded parachute pack 12 and a deployment switch assembly 20. Static line 13 with one end firmly anchored within the aircraft is connected jointly to the apex of the folded parachute 12 and to arming pin 30 of the deployment switch assembly (see FIG. 6). As the cargo begins to free-fall after ejection, static line 13 is withdrawn from the parachute pack at the same time pulling arming pin 30 from the switch assembly 20 (see FIG. 6). As the cargo continues to fall, static line 13 withdraws the parachute apex fully in a reefed condition from its folded form atop the cargo load.

At such time as the reefed parachute is fully withdrawn, continued tension on the static line due to the falling cargo load causes the static line to rupture at its point of connection to the parachute apex in the conventional manner.

As illustrated in FIG. 2, the descending assemblage consists of cargo 11, securely fastened to suspension lines 14, which are in turn connected to canopy 15 of the parachute which is maintained in a closed (i.e. reefed) condition by a reefing line 16 conventionally secured at the point of connection between canopy 15 and suspension lines 14.

In this condition of partial deployment, the reefed parachute acts very much as a stabilizer during the descent of the cargo which falls along a substantially predictable trajectory.

As hereinbefore referred to, suitably connected to the cargo is the parachute deployment switch assembly 20 whose ultimate function is to rupture reefing line 16 at a prescribed minimum altitude to permit the parachute canopy to fully deploy before cargo impact with the ground. It performs this function by lowering, beneath the falling cargo 11, a switch 32 on an electrical conductor 33 (comprised of wires 33a, 33b), which is in turn connected to a small explosive charge or squib 48 (see FIG. 8). This squib is conventionally positioned adjacent reefing line 16 so that on detonation, the reefing line will rupture. FIGS. 3 and 4 schematically illustrate the deployment of switch 32 beneath cargo 11.

To better understand the details of this novel switch assembly, reference is had to the schematic illustration of FIG. 7 which depicts this assembly in greater detail.

Canister 20 consists of a single cylinder divided into two compartments 21 and 22 and capped at each end with caps 23 and 24. Compartment 21 houses a timing motor 25, arming switch 26, firing switch 27, capacitor assembly 28, power pack 29, and arming pin 30, all electrically connected, as shown in FIG. 8.

Compartment 22 contains the spring loaded fairing assembly, comprising fairing 31 carrying within its housing an omni-directional switch 32 electrically connected to a spool of two-conductor wire 33. Interposed between bulkhead 34 and fairing 31 is a compressed release-spring 37 urging the fairing against a spring-loaded cap assembly 35.

Figure 7A:
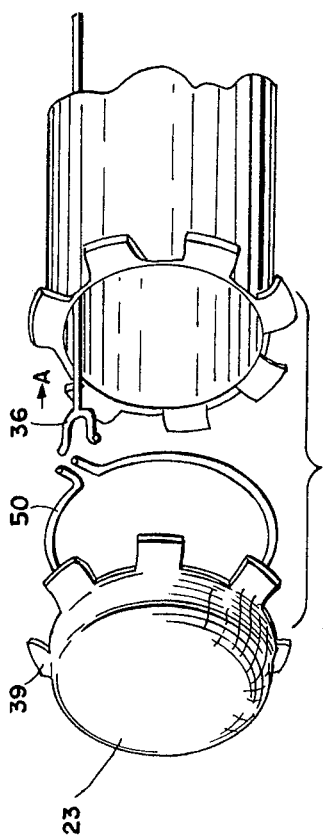
FIG. 7a shows in enlarged exploded detail view the forward end construction of the deployment switch assembly.

The details of cap assembly 35 are more clearly depicted in FIG. 7a wherein is illustrated in exploded view the end of canister 20. Fork trigger 36, when withdrawn in the direction of arrow A frees retaining spring 50 from constraint permitting it to expand and thereby release the yieldable corrugations 39 of cap 23 from engagement with cannister 20.

Figure 8:
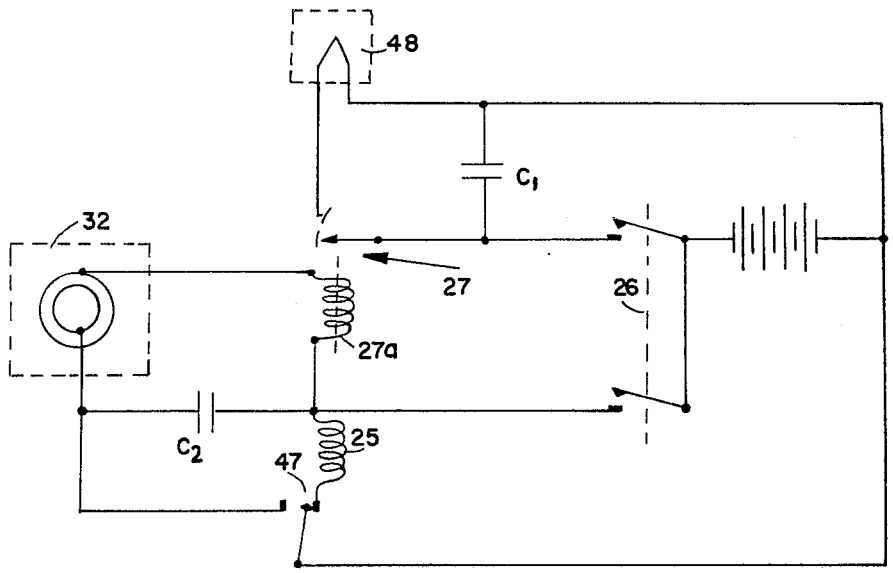
FIG. 8 illustrates the electrical wiring diagram for the switch assembly and dereefiing system.

Referring to FIGS. 7 and 8, a typical operational sequence of the electrical and mechanical functions of this system is as follows:

(1) Shortly after the cargo 11 leaves the aircraft, the static line 13 releases the arming pin 30 which arms switch 26 (see FIG. 8). At this instant the timing motor 25 is energized. The timing motor is mechanically coupled to the fork trigger 36 in a conventional manner.

(2) The fork trigger 36 is pulled through a fixed distance thereby releasing the spring loaded cap 23 causing the main release spring 37 to eject fairing 31 and its associated switch 32 and spool wound wire conductor 33. It is to be noted that in its accelerated travel as it leaves canister 20 the conductor wire is payed out from the spool center toward the outer windings. By projecting the entire spool of conductor wire 33 away from the falling cargo, any chance for entanglement therewith is virtually eliminated. When switch 32 reaches its terminal extent on wire 33, fairing 31 (see FIG. 4) falls away.

(3) Next, a switch 47 (shown in FIG. 8) is activated after a preset interval which is established by a conventional cam assembly (not shown) tied to the timing motor shaft, which causes omni-directional switch 32 to be armed. It should be noted that arming of switch 32 occurs after fairing 31 has been released and after initial deceleration (caused by release spring 37) has ceased.

(4) As the cargo 11 approaches the ground, switch 32 hanging some 275 feet or more beneath it, strikes the target area and closes switch 27 by energizing its solenoid winding 27a which fires squib 48 thereby rupturing reefing line 16, permitting the opening of parachute canopy 15. The varied pulse durations from switch caused by impact obviously require positive closing of switch 27 and this may be conventionally accomplished electronically.

The structural details of one embodiment of omnidirectional switch 32 are described in detail in a co-pending patent application of F. S. Baker, Ser. No. 577,428, filed Sept. 6, 1966.

Figure 9:
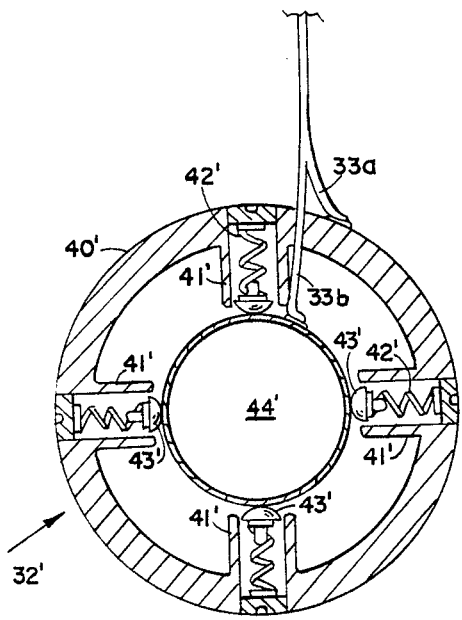
FIG. 9 illustrates an embodiment of the omni-directional switch.

FIG. 9 illustrates another embodiment of an omnidirectional switch 32' which comprises a spherical hollow shell 40' of electrically conductive material. Projecting inwardly toward a mutually intersecting point are six electrically conductive generally annular shaped contacts 41' connected to the shell 40'. Carried within each annular contact 41' is a coil spring 42' carrying at its outer end an electrically insulating cap 43' which protrudes a predetermined distance beyond the end of contact 41'. As illustrated in FIG. 9, the resiliently biased insulated caps 43' carry, in cooperative relation, an electrically conductive spherical ball 44' in movable proximity to contacts 41'. Conductive wire 33a is electrically connected to shell 40', and wire 33b is electrically connected to ball 44'. It can thus be seen that switch 32' is omni-directional in operation since an impact from any direction will leave sufficient momentum in ball 44' to overcome the spring constant of any of springs 42' and thereby permit ball 44' to come into contact with a contact 41' to complete the electrical circuit.

Though this invention has been described as having application to dereefing a parachute, its scope should be recognized as having broader application. In this connection switch 32 can function as a remotely located electrical switch in any gravitational environment through which an electrical circuit is passing, provided this switch itself has a relative velocity which is not less than that of the remaining circuit to which it is connected. In such applications, an impact switch and detonating circuit of this type may be used to detonate fragmentation bombs when used in low-level air attacks. Such cases usually require an aerodynamic braking (by parachute or otherwise) of the bombs to give the aircraft an opportunity to gain distance from the area of detonation, yet require, for effectiveness of fragmentation damage, that the bomb explode at some point above ground.

Having thus described the invention, what we desire to claim and protect by Letters Patent is:

1. Apparatus for delivery of a load by parachute from an aircraft comprising the combination of: a free-falling electrical circuit means in a gravitational environment; an omni-directional switch means remotely located a predetermined distance in advance of said falling electrical circuit and connected thereto only by electrical conductors, said switch means maintaining a vertical velocity not less in magnitude than the circuit to which it is connected; said electrical circuit means being attached to the load and controlling in combination with the switch means the deployment of a reefed parachute; and means for ejecting said switch means including a main release spring, a spring load cap arranged to compress the main release spring, a retaining spring for securing said spring load cap, and a fork trigger, said fork trigger being mechanically coupled to the retaining spring such that said spring load cap is ejected upon an activation of said fork trigger.

2. A deployment switch assembly comprising: a canister containing an electrical circuit connected to a remotely located explosive squib; a cap means resiliently engaged with one end of said canister by a spring; retaining means releasably connected to said spring; power means for disconnecting said retaining means from said spring; a resiliently biased fairing member within said canister constantly urged against said cap means by a compression spring; said fairing containing an omni-directional switch electrically connected to the aforesaid electrical circuit.

3. The structure of claim 2 wherein the switch comprises: a structurally rigid envelope carrying therewithin a resiliently biased electrical terminal in insulated relation to a cooperating terminal, said resiliently biased terminal adapted to co-act with the cooperating terminal when said rigid envelope impacts with another mass.

References Cited

UNITED STATES PATENTS

| | | | |
|---|---|---|---|
| 3,015,463 | 1/1962 | Gross | 244—147 |
| 3,049,322 | 8/1962 | Vlasic | 244—152 |
| 3,303,304 | 2/1967 | Campbell et al. | 200—61.45 |
| 3,362,664 | 1/1968 | McElroy | 244—138 |

FOREIGN PATENTS 329,053    8/1935    Italy.

OTHER REFERENCES

U.S. Air Force Parachute Handbook, WADC Technical Report 55–265, December 1956, pp. 3-2-12.

MILTON BUCHLER, *Primary Examiner.*

R. A. DORNON, *Assistant Examiner.*

U.S. Cl. X.R.

102—4, 7.4; 200—61.42, 61.45; 244—147